(12) United States Patent
Phua

(10) Patent No.: US 9,316,540 B1
(45) Date of Patent: Apr. 19, 2016

(54) COMPACT SPECTROMETER

(71) Applicant: LightHaus Photonics, Pte. Ltd., Singapore (SG)

(72) Inventor: Poh Boon Phua, Singapore (SG)

(73) Assignee: LightHaus Photonics Pte. Ltd., Singapore (SG)

( * ) Notice: Subject to any disclaimer, the term of this patent is extended or adjusted under 35 U.S.C. 154(b) by 0 days.

(21) Appl. No.: 14/642,827

(22) Filed: Mar. 10, 2015

(30) Foreign Application Priority Data

Feb. 16, 2015 (SG) .............................. 10201501196P

(51) Int. Cl.
| | | |
|---|---|---|
| *G01J 3/46* | (2006.01) | |
| *G01J 3/45* | (2006.01) | |
| *G01J 3/447* | (2006.01) | |
| *G01J 3/28* | (2006.01) | |
| *G01J 3/02* | (2006.01) | |

(52) U.S. Cl.
CPC ................ *G01J 3/45* (2013.01); *G01J 3/0272* (2013.01); *G01J 3/2823* (2013.01); *G01J 3/447* (2013.01)

(58) Field of Classification Search
CPC ................ G01J 3/02; G01J 3/10; G01J 3/18; G01J 3/28; G01J 3/2803; G01J 3/2823; G01J 3/46; G01J 3/50; G01J 3/524; G01J 3/51
USPC ................................................. 356/300–453
See application file for complete search history.

(56) References Cited

U.S. PATENT DOCUMENTS

| | | | |
|---|---|---|---|
| 5,774,215 A | 6/1998 | Padgett et al. | |
| 5,781,293 A | 7/1998 | Padgett et al. | |
| 6,222,627 B1 | 4/2001 | Seitz et al. | |
| 6,222,632 B1 | 4/2001 | Bakin | |
| 6,421,131 B1 | 7/2002 | Miller | |
| 6,519,040 B1 | 2/2003 | Amos | |
| 6,765,670 B2 | 7/2004 | Olsson et al. | |

(Continued)

FOREIGN PATENT DOCUMENTS

WO WO 2011/093794 A1 8/2011

OTHER PUBLICATIONS

Chu-Yu Huang et al., A Fourier Transform Spectrometer Based on Birefringent Interferometer, 2012 Intl. Symposium on Optomechatronic Tech. (ISOT), 2012, pp. 1-4, IEEE.

(Continued)

*Primary Examiner* — Abdullahi Nur
(74) *Attorney, Agent, or Firm* — Porter, Wright, Morris & Arthur, LLP

(57) ABSTRACT

A spectrometer for measuring a spectral signature of an object comprises fringe generating optics for use with a camera and a processor. The fringe generating optics are formed of front optics and birefringent optics. The front optics comprises a diffuser adapted to receive light from the object. The birefringent optics is adapted to receive light from the diffuser and to generate interference fringes. The camera is adapted to receive the interference fringes and the processor generates the spectral signature of the object. This spectrometer is an improved Fourier transform spectrometer suitable for use with digital cameras, such as cameras found in mobile devices.

3 Claims, 7 Drawing Sheets

(56) References Cited

U.S. PATENT DOCUMENTS

| | | |
|---|---|---|
| 6,985,233 B2 | 1/2006 | Tuschel et al. |
| 7,012,695 B2 | 3/2006 | Maier et al. |
| 7,262,839 B2 | 8/2007 | Treado et al. |
| 7,738,095 B2 | 6/2010 | Gardner, Jr. et al. |
| 8,768,600 B2 | 7/2014 | Blanc et al. |
| 8,830,475 B1 | 9/2014 | Wang et al. |
| 2012/0268745 A1 | 10/2012 | Kudenov |
| 2013/0322750 A1* | 12/2013 | Agarwal ............... G06K 9/4652 382/165 |
| 2014/0022535 A1* | 1/2014 | Yamamoto ............ G01J 3/0205 356/72 |

OTHER PUBLICATIONS

Chunmin Zhang et al., Wide-field-of-view Polarization Interference Imaging Spectrometer, Applied Optics, Nov. 20, 2004, pp. 6090-6094, vol. 43, No. 33.

* cited by examiner

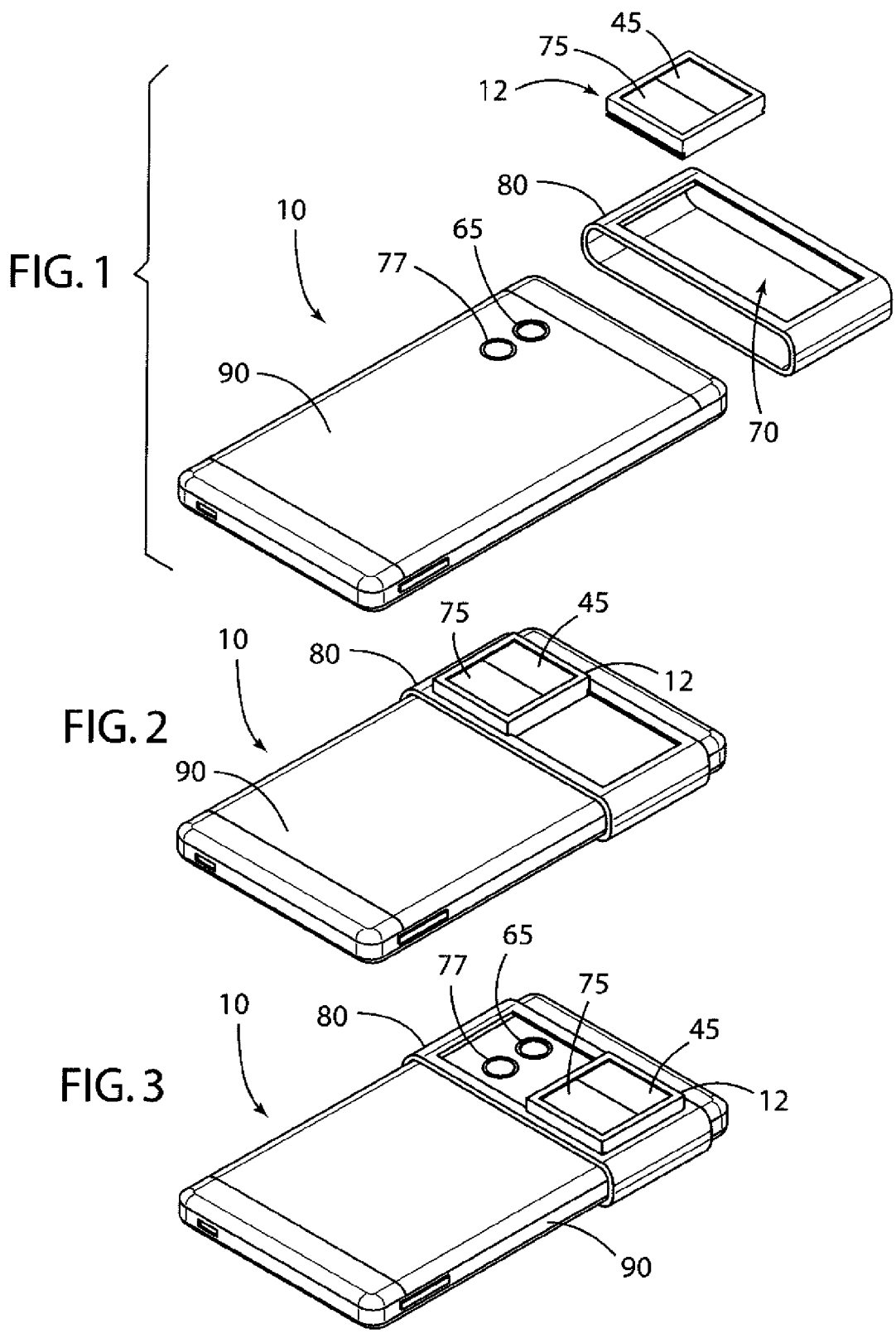

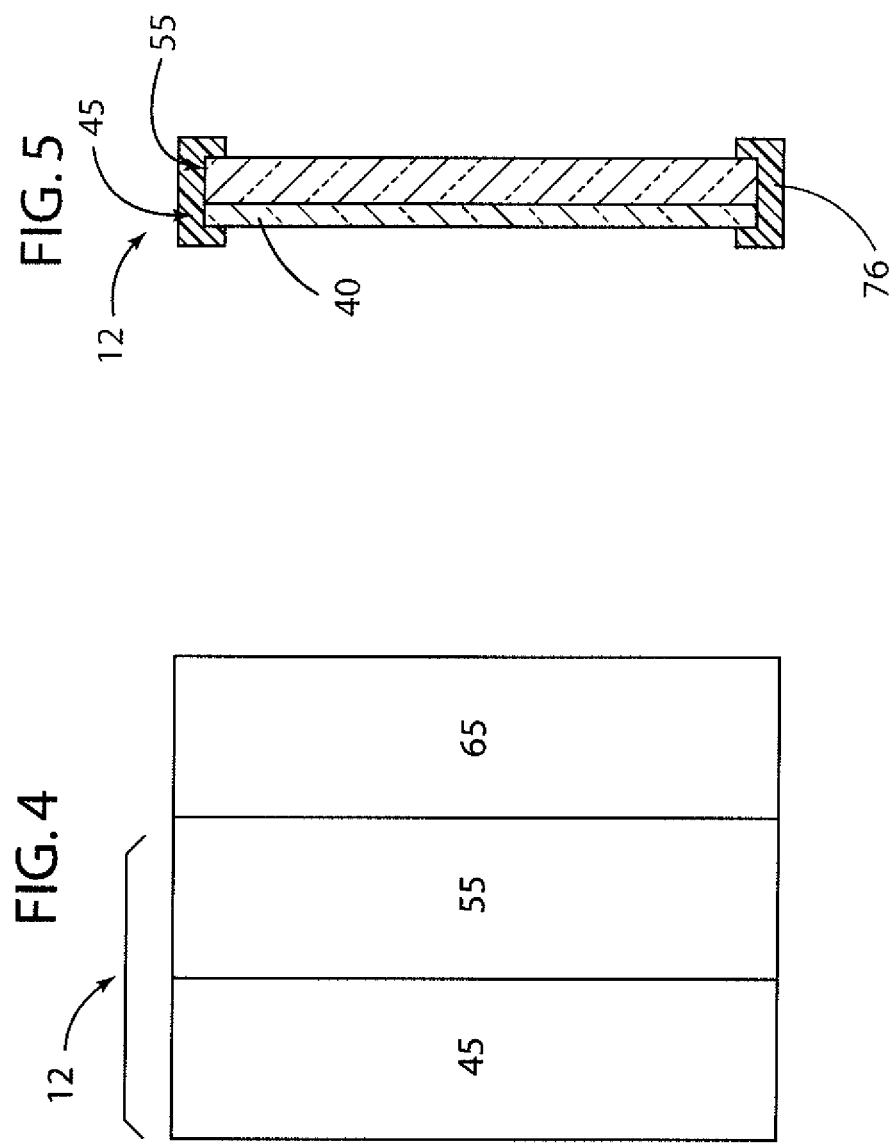

COMPACT SPECTROMETER

FIELD OF THE INVENTION

This invention relates to spectrometers, and more particular to improved Fourier transform spectrometers suitable for use with digital cameras including cameras used in mobile devices.

BACKGROUND OF THE INVENTION

A spectrometer is an instrument used to measure properties of light over a specific portion of the electromagnetic spectrum, typically used to identify materials. The variable measured can be the light's spectral intensity or irradiance. Fourier transform spectrometers can be used for visible, infrared and ultraviolet frequencies, and are based on two-beam interference or polarization modulation phenomenon to generate a resulting interferogram. The Fourier transform of a resulting interferogram corresponds to the spectral signature of incoming light.

One type of Fourier Transform interferometer uses birefringent optics to create polarization modulation with the angle of incidence of light and generate fringes across the field of view of an optical imager. For example, WO 2011/093794 to Phua et al discloses an advanced hyperspectral imaging device which provides spectral signatures of every point of a 2D image. A cascade of birefringent plates is used to generate linear (or curved) fringes which are relatively easy to process. While Phua et at is an elegant device which greatly simplifies optics required for generation of interferograms, the device requires scanning, that is, a large plurality of images have to be taken. Extensive computational processing is also needed to process the large plurality of images to give the spectral signatures of every point of the image. The large processing requirements for such a hyperspectral imaging device will not work well with digital cameras, especially those found in mobile devices. This is due in part to the relatively limited processing power available in mobile devices. Further, jitter during scanning will lead to the introduction of high spectral inaccuracies.

Other known spectrometers are relatively difficult to use with field work outside of a lab, and they are typically much more expensive, require frequent spectral recalibration, require several display/control/power accessories before the spectrometer can function properly, and are simply too bulky and inconvenient to carry around while running a daily routine. As such, spectrometers, although highly useful analytical instruments, have seen limited adoption by the general public and are normally restricted to lab work. It would be desirable to provide a spectrometer which is small enough to be used with existing digital cameras, especially those incorporated into conventional mobile devices, and which is lightweight and convenient enough to carry around while running a daily routine. It is also would be desirable to provide a spectrometer which does not require mechanical scanning, and which can capture a spectral signature of an object in a single snapshot while only requiring the simple processing power that mobile devices can handle while still maintaining a high level of spectral fidelity to allow for accurate and rapid analysis.

SUMMARY OF THE INVENTION

In accordance with a first aspect, there is provided a spectrometer for measuring a spectral signature of an object which comprises fringe generating optics for use with a camera and a processor. The fringe generating optics is formed of front optics and birefringent optics. The front optics comprises a diffuser adapted to receive light from the object. The birefringent optics is adapted to receive light from the diffuser and to generate interference fringes. The camera is adapted to receive the interference fringes and the processor generates the spectral signature of the object.

From the foregoing disclosure and the following more detailed description of various embodiments it will be apparent to those skilled in the art that the present invention provides a significant advance in the technology of spectrometers. Particularly significant in this regard is the potential the invention affords for providing a high quality spectrometer of small size which can readily be used with the camera of a conventional mobile device so as to make the spectrometer remarkably convenient to carry around while running a daily routine. Additional features and advantages of various embodiments will be better understood in view of the detailed description provided below.

BRIEF DESCRIPTION OF THE DRAWINGS

FIG. 1 is an exploded isometric view of a compact spectrometer in accordance with one embodiment for use with a camera of a mobile phone.

FIG. 2 is an isometric view of fringe generating optics of the embodiment of FIG. 1 shown positioned over a lens of the camera.

FIG. 3 is an isometric view of the optics of the embodiment of FIG. 1 shown positioned away from the lens of the camera.

FIG. 4 is a block diagram showing a sequence of front optics, birefringent optics and the camera.

FIG. 5 is an embodiment of the front optics formed as a single layer diffuser positioned in front of the birefringent optics.

Figure 6:
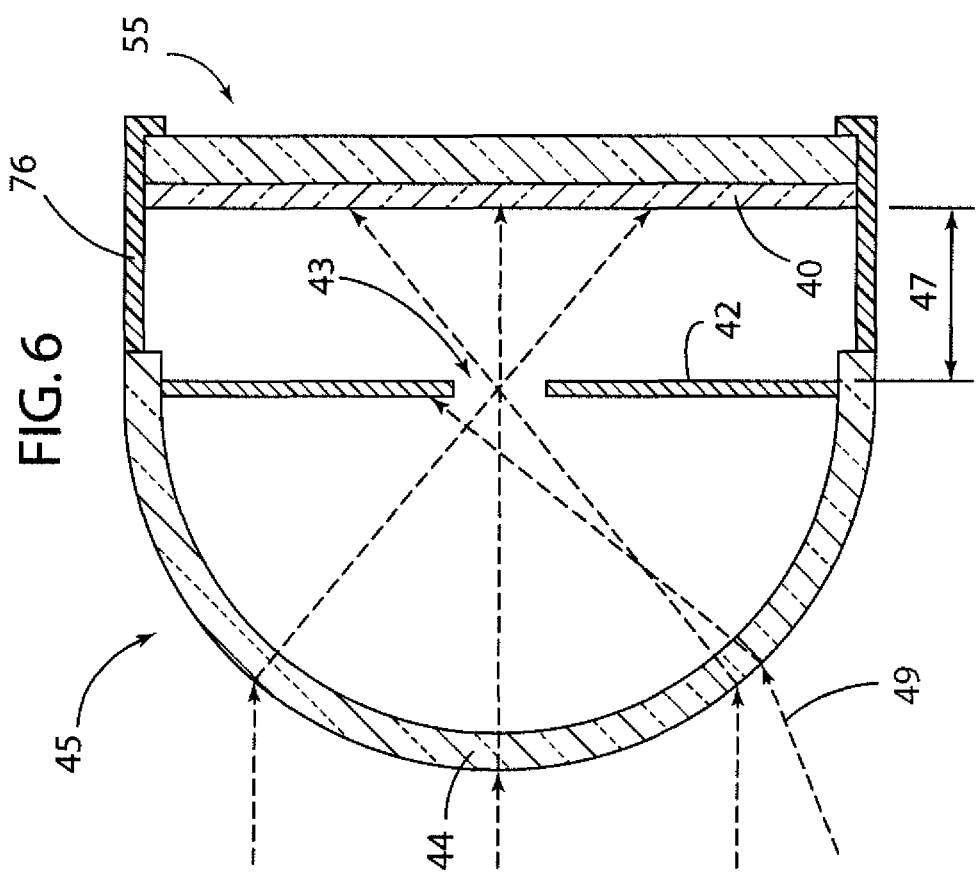
FIG. 6 is another embodiment of the front optics formed as a lens, an aperture mask and a diffuser plate positioned in front of the birefringent optics.

It should be understood that the appended drawings are not necessarily to scale, presenting a somewhat simplified representation of various features illustrative of the basic principles of the invention. The specific design features of the compact spectrometer as disclosed here, including, for example, the specific dimensions of the birefringent layers, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the compact spectrometer disclosed here. The following detailed discussion of various alternate features and embodiments will illustrate the general principles of the invention with reference to an imaging device suitable for use with a digital camera such as those incorporated into a conventional mobile device. Other embodiments suitable for other applications will be apparent to those skilled in the art given the benefit of this disclosure.

Turning now to the drawings, FIG. 1 is an isometric view of a spectrometer 10 in accordance with one embodiment suitable for use in conjunction with a standard digital camera 65 incorporated into a conventional mobile phone 90. Compact spectrometers such as those disclosed herein may be used to obtain the spectral signature of an object, and can be used in a wide variety of applications, such as, for example, colorimetry applications, environmental monitoring, chemicals analysis, material analysis and identification, pollutants monitoring, monitoring of crops, mineralogy identification, spectral applications in industrial automation, medical diagnostics and forensic applications. Other uses for the compact spectrometers disclosed herein will be readily apparent to those skilled in the art given the benefit of this disclosure.

Advantageously, the spectrometer 10 is compact and lightweight with a remarkably small footprint. The spectrometer 10 comprises fringe generating optics 12 which are comprised of front optics 45 and birefringent optics 55. Light reflected from or generated by the object whose spectral signature is to be measured passes sequentially through the front optics 45 to the birefringent optics 55, and from there to the camera 65, typically a digital camera incorporated into a mobile device, here a mobile phone 90. Mobile devices are understood herein to refer broadly to mobile phones, tablets, laptops, etc., and even pcs in some applications. The digital camera generates a signal based on the images it receives and in turn relays that signal to a processor, which generates the spectral signature. The size of the fringe generating optics 12 is preferably sufficiently large enough to cover the entire aperture of camera 65, but need not be any larger. Moreover, a thickness of the fringe generating optics is sufficiently small that the device will easily fit in a pocket in much the same was as a conventional mobile phone fits. In accordance with another highly advantageous feature, the processors typically found in the phone 90 are sufficient for purposes of calculating the spectral signature of the object using the spectrometer disclosed herein. The spectral signature and related control interface can be displayed and controlled on existing display panel of the mobile device without requiring additional control and power management accessories.

The fringe generating optics 12 may be positioned in a housing 80. Further, the fringe generating optics 12 may be adjustable between an operational position (FIG. 2) where the fringe generating optics 12 are positioned in front of the camera 65, to a nonoperational position (FIG. 3) where the camera can function in the normal manner. In the embodiment of FIGS. 1-3, the housing 80 is an external attachment adapted to be placed on the mobile device, and is shown in this embodiment as band shaped, extending around the phone 90 and defining a run channel 70. The fringe generating optics 12 is slidable in the run channel 70 between positions. Alternatively the housing 80 may be formed as part of a device cover (not shown), and the fringe generating optics may be rotated between the operational and the nonoperational positions. Optionally the housing 80 may also be built into the mobile device.

In operation, the spectrometer works best with the object relatively close to the fringe generating optics/mobile device so that the light reflected is primarily from the object. Light from the object is understood herein to mean typically light reflected off the surface of the object or light emitted by the object or light transmitted through the object whose spectral signature is sought. Having a consistent and uniform source of light illuminating the object is valuable in terms of normalizing the measured spectral signatures to obtain the object's spectral reflectance or spectral absorbance. With conventional digital cameras incorporated into mobile devices a flash light or light source 77 is almost always provided and the light source is made with high quality control, so the light source is relatively consistent from phone to phone. The light source 77 is normally designed to provide a relatively uniform light source at some distance from the camera, and that distance is typically greater than the normal operating distance for obtaining spectral signatures. Therefore, the fringe generating optics may optionally be provided with a light diffuser 75 as shown in FIGS. 1-3. The light diffuser 75 would be positioned in front of the flash 77 when the fringe generating optics 12 (front optics 45 and birefringent optics 55) are positioned in front of the camera, and thereby make the light or flash shone on the object relatively uniform and consistent. Alternatively, the light diffuser 75 may also incorporate a light guide (not shown) before diffusing the light for a more uniform and consistent illumination on the object. The spectrometer may also provide a reference reflectance material or surface as a built-in or external accessory to perform calibration on the spectral signature of the flash 77.

FIG. 4 is a simple schematic showing the preferred order when the fringe generating optics 12 are in the operational position. Light passes through the front optics 45, to the birefringent optics 55, and from there to the camera 65. The camera generates a signal and relays that signal to a processor which generates the spectral signature of the object in the manner described in greater detail below.

FIG. 5 shows one embodiment of the front optics 45 formed as a single layer optical diffuser 40. The diffuser 40 can comprise any material which acts to homogenize or scatter background light received. For example, in the embodiment of FIG. 5, the diffuser 40 can comprise a rough ground translucent layer separate from the birefringent optics 55, optionally positioned immediately adjacent the birefringent optics. The diffuser 40 may also be formed as a rough ground front surface of the first polarizer 20 of the birefringent optics 55. Alternatively, the diffuser 40 can also be a micro-lens lenticular sheet or micro-lens lenticular array to scatter and homogenize light received before entering the birefringent optics 55. Also, front optics 45 and birefringent optics 55 may be contained in a frame 76. The frame 76 may be slidable in the run channel as noted above. The simple diffuser used as the front optic 45 in FIG. 5 makes the spectrometer implementation very low cost, compact and relatively immune to any optical misalignment.

In accordance with a highly advantageous feature, the diffuser 40 acts to homogenize the background so that a fringe image generated by the birefringent optics 55 and captured by camera 65 is principally providing the spectral signature of the object. With the fringes present in front of a uniform background, a single snapshot image from camera 65 is sufficient to yield the spectral signature, and scanning of the birefringent optics 55 is no longer required. The uniform background advantageously also allows simple direct Fourier transform of the interferogram to give the spectral signatures without the complex processing algorithms required in Phua et al. This means that a spectral signature can now be obtained simply and quickly by using the processing power of existing mobile devices. With a uniform background, a single fringe image, as shown in either of FIG. 11 or FIG. 12, can advantageously provide a large plurality of single interferograms (easily more than a thousand) whose Fourier transform gives the spectral signatures of the object. By taking the average of this large number of spectral signatures, a high quality spectral signature of the object with significantly reduced noise can be obtained.

As the embodiment in FIG. 5 measures the spectral signatures of the light homogenized by the diffuser 40, it works well when the object-of-interest is relatively close, most preferably less than a few centimeters from the fringe generating optics/mobile device. The embodiment in FIG. 6 gives some directionality in the measurement and allows the spectrometer to aim and measure spectral signatures of objects that are farther away, for example, as far as a few meters. The front optics 45 is formed as an additional focusing lens 44 and a mask 42 that defines an aperture 43 which limits the amount of light which is passed onto the diffuser 40. The aperture 43 is spaced apart from a diffuser 40 by a distance 47. Tracer rays show how this embodiment would limit light 49 coming in from the sides, usually away from the object whose spectral signature is sought. The distance 47 is preferably set so that the area covered by the tracer rays at the diffuser 40 is larger than the cross-sectional area of the aperture of the camera 65.

Figure 7:
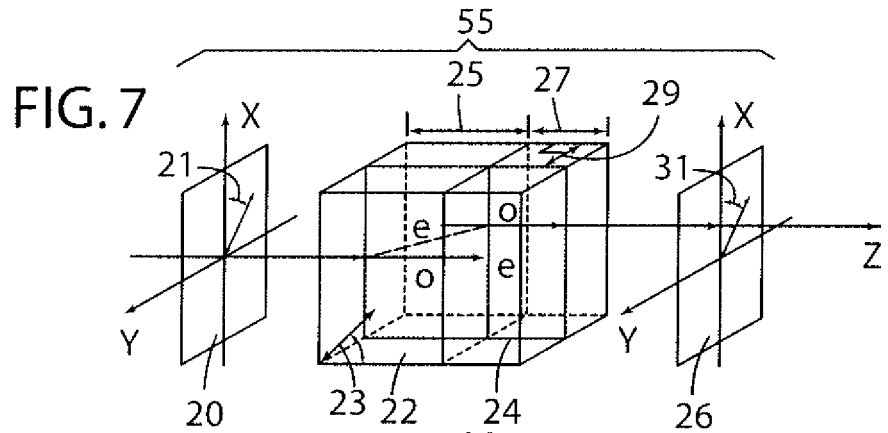
FIGS. 7-10 show four representative examples of the birefringent optics.

For the birefringent optics 55 either birefringent prisms or flat parallel birefringent plates may be used. Generally however, due to space constraints of working with a mobile device and the simplicity of the design, flat parallel plate birefringent layers are preferred. With flat parallel plate birefringent layers the birefringent optics 55 can be constructed as thin as 1 mm. FIG. 7 shows a schematic optical layout of one embodiment of the birefringent optics 55 of the compact spectrometer. Light reflected from the object whose spectral signature is desired projects through the front optics 45 and has an optical axis which extends along a Z-axis. The Z-axis is a horizontal axis in the plane of the paper as shown in FIG. 7. The light passes through a first polariser 20 which has a first polarisation angle 21. The polarisation angle 21 is shown to be formed in an X-Y plane. The X-Y plane is generally perpendicular to the Z-axis (the direction of light transmission through the birefringent optics 55, from front optics 45 to digital camera 65) as shown in FIG. 7. The polariser transmits light linearly polarised at the polarisation angle in the X-Y plane. In accordance with one embodiment, the polariser angle may be 45° with respect to the X-axis. The light passes through the polariser is a linearly polarised beam which is transmitted to a first birefringent layer 22 having a first optic axis 23 formed at a first angle, then to a second birefringent layer 24 having a second optic axis 29 formed at a second angle, and then to a second polariser (sometimes referred to as an analyzer) 26. The birefringent layers 22, 24 may be formed of calcite, for example. The birefringent optics cooperate to produce an image of regular curved fringes of FIG. 12 which are projected through a lens which focuses the light onto a -detector array of the digital camera 65 of the mobile device. The second polariser 26 has a second polariser angle 31 which is related to the polariser angle 21. Preferably the second polariser angle is either the same as the first polariser angle with respect to the X-axis or at a 90° angle with respect to the first polariser angle for maximum fringe contrast. For example, the first polariser angle 21 can be 45° or −45° with respect to the X-axis and the second polariser angle 31 may be either ±45° with respect to the X-axis.

After passing through the first polariser 20, the linearly polarised light passes through the first birefringent layer 22, causing the light to be split into two beams that are orthogonal components of the polarised light. These components are sometimes referred to as the extraordinary ray or e-ray and ordinary ray or o-ray. The e-ray and the o-ray have different refractive indices. While the o-ray refractive index is constant and independent of the direction of light propagation, the refractive index of e-ray varies with the direction of light propagation. Consequently, one ray travels faster than the other through the layer 22 resulting in a phase difference between the e-ray and o-ray. The resulting phase difference is a function of several properties of the layer 22 and the light, including the propagation direction of e-ray and o-ray within the layer 22, a cut angle of the layer 22 with respect to the first optic axis 23, an angle between a plane containing the first optic axis 23 and a plane of incidence of the light, a wavelength of the polarised light, a thickness 25 of the layer and a material of layer 22. This phase difference varies with the angle of incidence of light into the birefringent optics 55.

Figure 12:
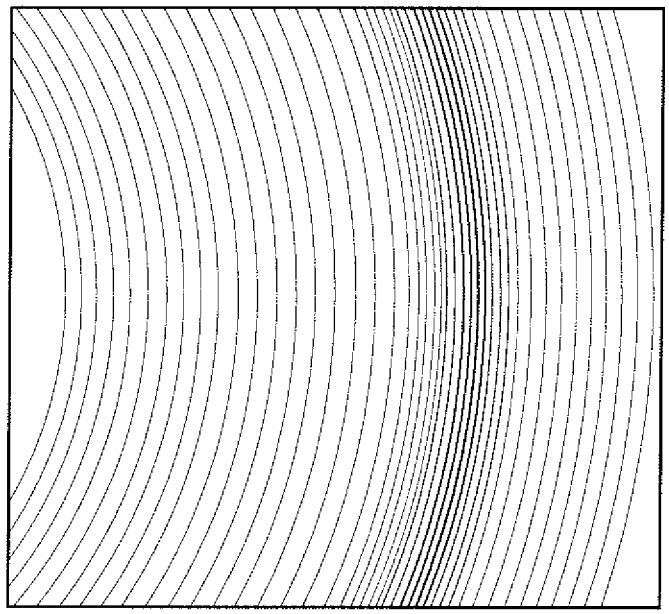
FIG. 12 is another representative fringe image captured by the camera, showing slightly curved fringes on a generally uniform background.
Figure 13:
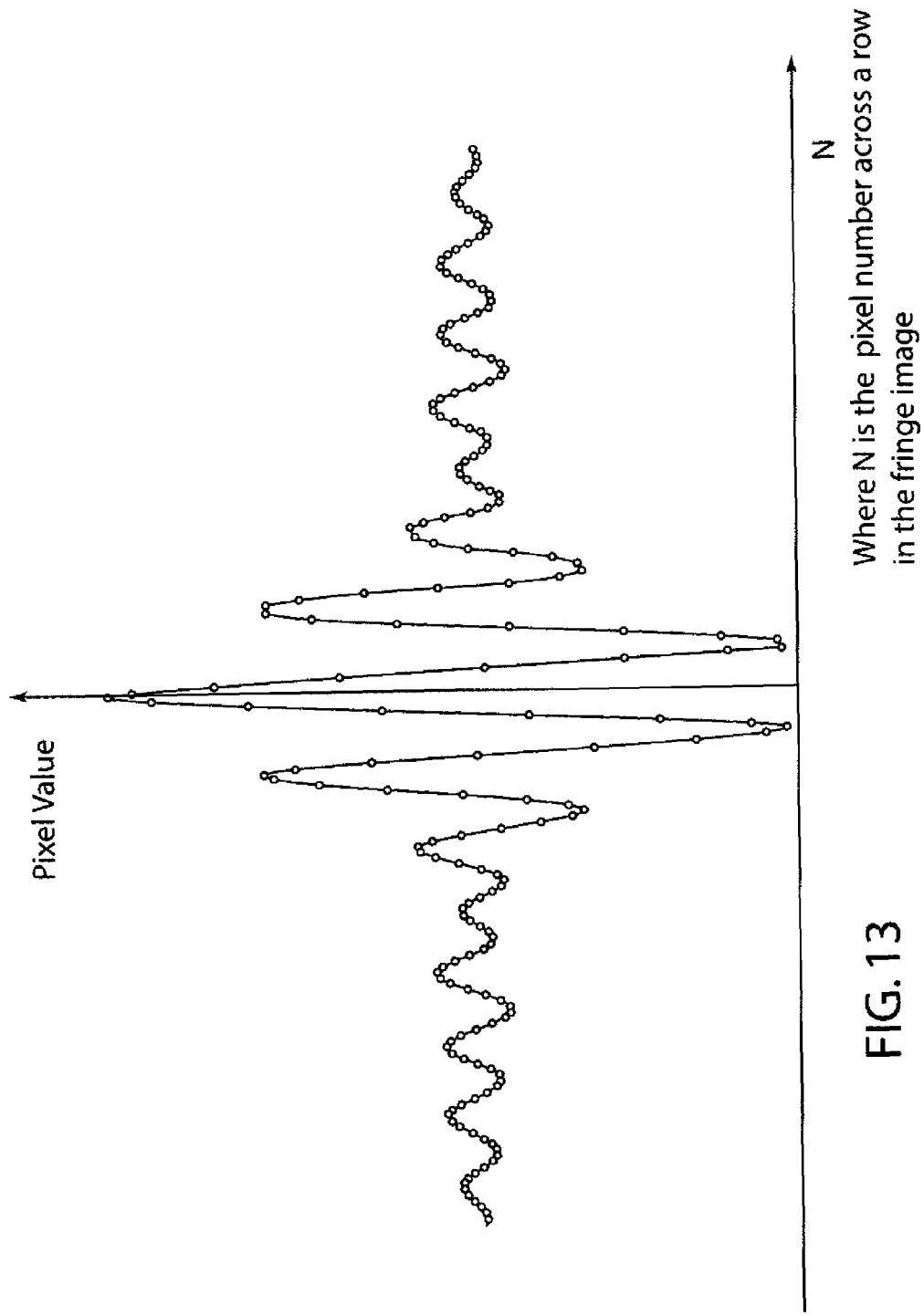
FIG. 13 is a representative single interferogram generated from the fringe image captured as a signal by the camera. The interferogram can be generated by plotting the pixel values across a single row of the fringe image.

In the embodiment of FIG. 7, the first birefringent layer 22 is positioned between the first polariser 20 and the second birefringent layer 24 such that the e-ray and o-ray exit the first birefringent layer 22 and immediately enter the second birefringent layer 24. Preferably the birefringent layers 22, 24 are in direct contact with one another. The second birefringent layer 24 has a second optic angle 29 which is related to the first angle 23. In the embodiment of FIG. 7, the second birefringent layer 24 compensates for the phase difference generated by the first birefringent layer 22 by having a slow axis of the second birefringent layer orthogonal to a slow axis of the first birefringent layer. The amount of phase difference compensated in the second birefringent layer is a function of several properties of the layer 24 and the light, including the propagation direction of e-ray and o-ray within the layer 24, a cut angle of the layer 24 with respect to the second optic axis 29, a wavelength of the polarised light, a thickness 27 of the layer and a material of layer 24. In the embodiment of FIG. 7, upon exiting the second birefringent layer 24, there will be a net phase difference that varies with the angle of incidence of light into the birefringent optics which creates polarization modulation of the light. When this light is analyzed by the second polarizer 26, it creates a modulation of the transmitted light intensity with the angle of incidence. This intensity modulation manifests as curved fringes in the image detected by camera 65 as shown in FIG. 12.

Only two birefringent layers are used to generate curved fringes in the embodiment of FIG. 7. The first optic axis 23 of the first birefringent layer 22 lies at an angle from the X-axis in an X-Z plane, where the X-Z plane is defined by the X-axis and the Z-axis and the Z-axis is the direction of propagation of light through the birefringent optics. Optionally the first optic angle is between −90° to 90° from the X-axis, and more preferably at ±45° from the X-axis, since this angle is associated with generation of fringes that minimize the layer thickness and also allow for reduced computational processing. In this embodiment, the second optic axis 29 of the second birefringent layer 24 is within ±20° of the Y-axis, and more preferably perpendicular to the Z-axis and along the Y-axis. This can also be expressed as at a 90° angle with respect to the X-axis or Z-axis. In these embodiments the second optic angle 29 is in a plane orthogonal to the first optic angle 23 and in a plane perpendicular to the Z-axis. The first optic angle of 45° and a second optic angle of 90° are associated with generation of fringes that minimize the layer thickness, and allow for reduced computational processing and as such is preferred. In the embodiment of FIG. 7, both layers 22 and 24 have positive birefringence, such that the velocity of the ordinary ray is greater than that of the extraordinary ray. Although a first optic angle of 45° and a second optic angle of 90° is recited in this embodiment, a similar result can be achieved with other angles by adjusting thicknesses 25, 27 or material selection of the layers 22, 24 respectively. Upon exiting the first birefringent layer, the polarised beams enter the second birefringent layer. The e-ray in the first birefringent layer becomes an o-ray in the second birefringent layer. Likewise, the o-ray in the first birefringent layer becomes an e-ray in the second birefringent layer. In this embodiment, the thickness 25 of the positive first birefringent layer 22 is different from (larger) than the thickness 27 of the positive second birefringent layer 24 and both crystals can be made of the same or different birefringent materials of positive birefringence.

The embodiment described above can be varied by adjusting the first angle or the birefringence of the first layer, but if the birefringence is adjusted, then the birefringence of the second layer must be adjusted as well. For example, a positive first birefringent layer 22 can have an optic axis lying in the X-Z plane at −45° from the X-axis. The corresponding second birefringent layer 24 has the same second angle as described in the paragraph immediately above, and has positive birefringence. If the birefringence of the first layer 22 is switched to negative birefringence then the birefringence of the second layer 24 is similarly switched to negative. Both layers have the same birefringence merely in the sense that they have the same sign of birefringence, more specifically, both are either positive or negative. In each of these embodiments, the second thickness 27 is less than the first thickness 25.

Figure 8:
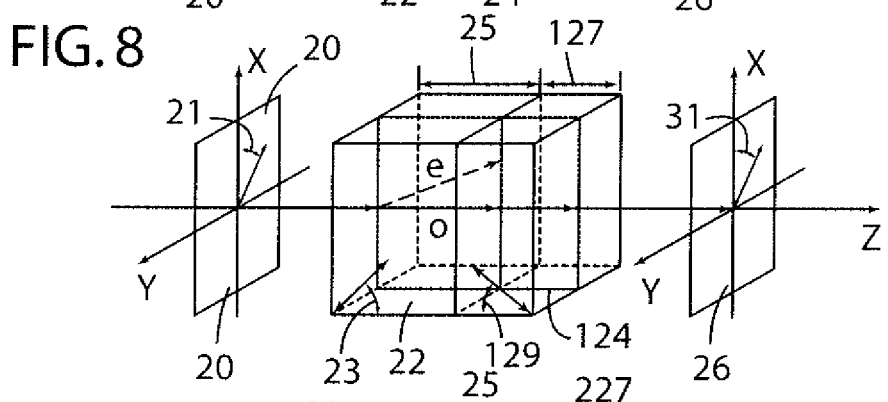

FIG. 8 illustrates a schematic of optical layout of another embodiment where the first birefringent layer 22 and the second birefringent layer 124 are of different materials. The layers 22, 124 have opposite birefringence merely in the sense that when one is positive the other is negative. The optic axis of the first birefringent layer 22 lies in the X-Z plane and the optic axis of the second birefringent layer 124 lies in the X-Z plane as well. The first angle 23 may be the same as the second angle 129 in magnitude but in an opposite sign with respect to the X-axis. The first layer 22 has positive birefringence and the second layer 124 has negative birefringence. Optionally the first optic angle 23 is between −90° to 90° and the second optic angle 129 is between 90° to −90° from the X-axis, and more preferably they are at ±45° from the X-axis as shown in FIG. 8, since this angle is associated with generation of fringes that minimize the layer thickness, also allow for reduced computational processing and as such is preferred. Also, the birefringence of the layers may be switched such that the first layer 22 has negative birefringence and the second layer 124 has positive birefringence. Since the layers 22, 124 comprise different materials, a chirp is introduced in the resulting signal. The chirp advantageously helps reduce a dynamic range required to improve signal-to-noise ratio.

As with the embodiments of FIG. 7, the thickness 25 of the first birefringent layer 22 is different from the thickness 127 of the positive second birefringent layer 124. Also, the linearly polarised beam from the polarises enters the first birefringent layer 22 and is split into two polarization components—the o-ray and the e-ray. Upon exiting the first birefringent layer, the e-ray and the o-ray enter the second birefringent layer 124. With the embodiments of FIG. 8 which have opposite birefringence, the e-ray in the first birefringent layer remains an e-ray in the second birefringent layer. Likewise, the o-ray in the first birefringent layer remains an o-ray in the second birefringent layer. In all of the above embodiments, upon exiting the second birefringent layer, there will be a net phase difference between the e-ray and the o-ray. This phase difference varies with the angle of incidence of light into birefringent optics 55 and creates polarization modulation of the light. When this light is analyzed by the second polarizer 26, it creates a modulation of the transmitted light intensity with the angle of incidence. This intensity modulation manifests as the line fringes in the interferogram shown in FIG. 11 when detected by camera 65.

Figure 9:
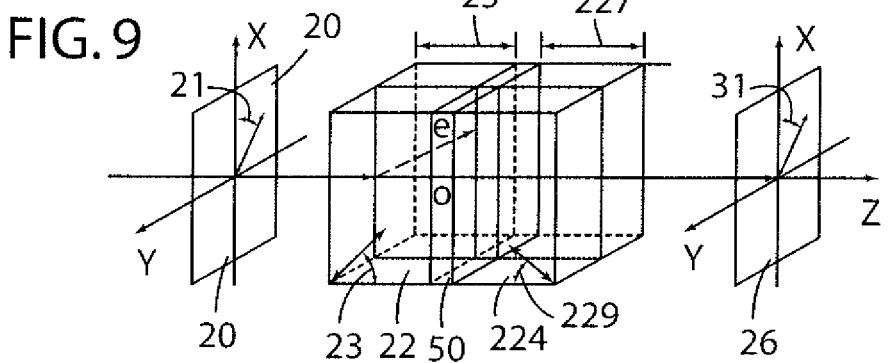
Figure 11:
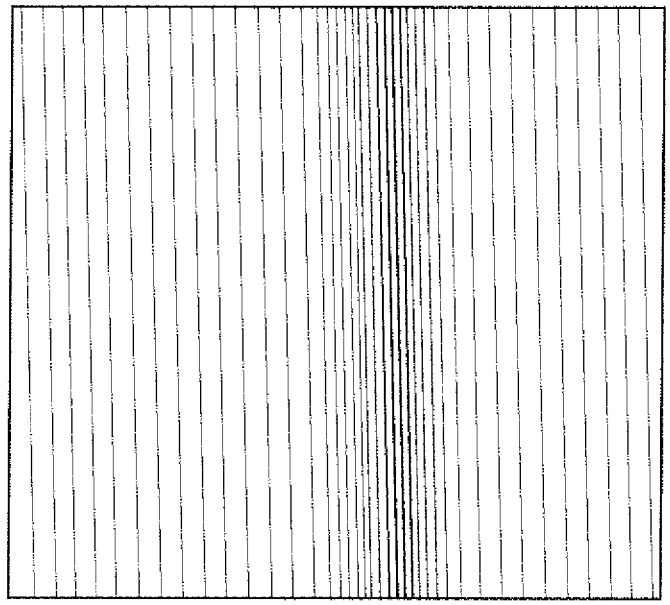
FIG. 11 shows a representative fringe image captured by a camera, showing linear fringes on a generally uniform background.

FIG. 9 discloses another embodiment of the birefringent optics 55. Here the same birefringent material is used for birefringent plates 22, 224 and the plates have the same optic axes 23, 229 as the second embodiment of FIG. 8, but the plates have equal thicknesses 25, 227. Optionally the first optic angle 23 is between −90° to 90° and the second optic angle 229 is between 90° to −90° from the X-axis, and more preferably they are at ±45° from the X-axis, since these angles are associated with generation of fringes that minimize the layer thickness, allow for reduced computational processing and as such is preferred. To adjust for this and to produce a useful interferogram a ½ wave plate or retarder 50 is used to switch the polarisation of linearly polarised light. The retarder 50 is positioned between the two birefringent layers 22, 224. Most preferably the first birefringent plate, ½ wave plate and second birefringent layers are sandwiched together, as shown in FIG. 9. Also, the linearly polarised beam from the first polariser 20 enters the first birefringent layer 22 and is split into two polarization components—the o-ray and the e-ray. Upon exiting the first birefringent layer, the e-ray and the o-ray enter the retarder 50 and they are switched in polarization so that the e-ray in the first birefringent layer 22 becomes the o-ray when it enters the second birefringent layer 224. Likewise, the o-ray in the first birefringent layer 22 becomes the e-ray in the second birefringent layer 224. Upon exiting the second birefringent layer, there will be a net phase difference between the e-ray and the o-ray. This phase difference varies with the angle of incidence of light into the birefringent optics 55 and it creates polarization modulation of the light. When this light is analyzed by the second polarizer 26, it creates a modulation of the transmitted light intensity with the angle of incidence. This intensity modulation manifests as straight line fringes, again as shown in FIG. 11, in the image detected by camera 65.

Figure 10:
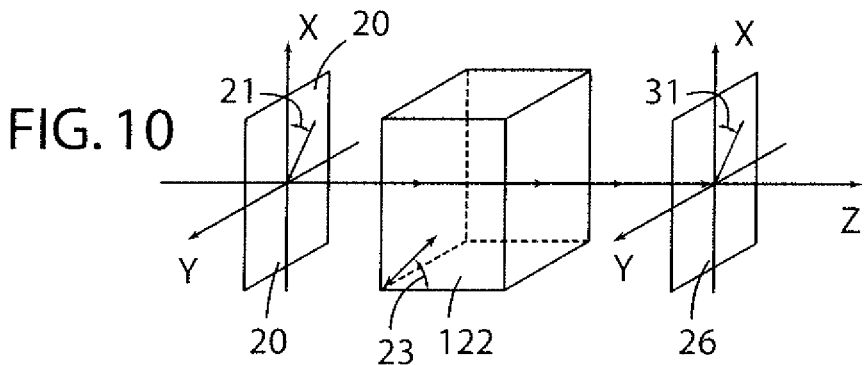

FIG. 10 discloses another embodiment of the birefringent optics 55. Whereas the first three representative embodiments of the birefringent optics can be constructed using either uniaxial or biaxial birefringent crystals, in the embodiment of FIG. 10 only a biaxial birefringent crystal is used. In accordance with a highly advantageous feature, a single birefringent plate 122 is used for the birefringent optics 55. This single birefringent layer 122 is constructed using a biaxial birefringent crystal such as Potassium Titanyl Phosphate (KTP), for example. Both optic axes of the birefringent layer 122 lie in the X-Z plane. Optionally the angle of one of the optics axes, optic angle 23, is between −90° to 90° and more preferably, one of the optics axes of layer 122 is along the Z-axis since this angle is associated with generation of fringes that require reduced computational processing.

For each of the disclosed embodiments there will be a net phase difference between the two orthogonally polarized rays upon exiting the last birefringent layer. This phase difference varies with the angle of incidence of light into birefringent optics 55 and creates polarization modulation of the light entering the second polarizer 26. When this light is analyzed by the second polarizer 26, a modulation of the transmitted light intensity with the angle of incidence is created. This intensity modulation manifests as the regular straight fringes in FIG. 11 (in the embodiments of FIGS. 8 and 9) or regular curved fringes shown in FIG. 12 (in the embodiments of FIGS. 7 and 10) when detected by camera 65.

As noted above, without the diffuser 40, the generated fringes of birefringent optics 55 will be superimposed onto the image of the outside source. Direct Fourier transform of the interferogram obtained from such images will yield incorrect spectral signatures of the object. In accordance with a highly advantageous element, the diffuser 40 acts to make background uniform and homogeneous, essentially allowing the elimination of background scene information from the signal, and thereby allowing for direct Fourier transform of the interferogram to give accurate spectral signature of the object. Reducing the background data allows for ease of processing which can be handled by the processors found in conventional mobile devices.

As noted above, the intensity modulation with angle of incidence after passing through birefringent optics 55 produces the regular straight fringes, as shown in FIG. 11, or regular curved fringes, as shown in FIG. 12, in the image detected by camera 65. FIG. 11 is a representative image of straight fringes captured by camera 65 using the embodiment of FIG. 8 and/or FIG. 9 while FIG. 12 is a representative image of curved fringes captured by camera 65 using either of the embodiments of FIG. 7 and FIG. 10. By plotting the pixel value across each row of the image, a single raw interferogram is obtained which shows the light intensity modulation versus the angle of incidence of light into birefringent optics 55. Applying a simple Fourier Transform to this interferogram will give the spectral signature. With a uniform background, a single image of fringes, as shown in FIG. 11 or FIG. 12, can advantageously provide a large plurality of single raw interferograms (easily more than a thousand) whose Fourier transform gives the spectral signatures of the object. By taking the average of a large number of spectral signatures, a high quality spectral signature measurement of the object is developed with significantly reduced noise.

Digital cameras in mobile devices typically have a relatively large numbers (a few million) of pixels. Within a single image of fringes, as shown in FIG. 11 and FIG. 12, there are typically more than a thousand of rows. Each row can produce a corresponding interferogram. By performing a Fourier Transform to each interferogram, more than a thousand of spectral signatures of the object may be obtained. Significantly, this can all be accomplished with the light homogenized by the diffuser 40 using just a single image of fringes. These measured spectral signatures are for the same light homogenized by the diffuser 40.

Therefore, in accordance with a highly advantageous feature, averaging can be done to reduce the spectral noise in measurements. A software control module or "app" is designed to perform a specific set of targeted instructions. In this case, the app may be incorporated as part of the original equipment or loaded to the processor on the mobile device via a standard internet connection. The software control module receives a signal based upon the interference fringes created by the fringe generating optics which corresponds to a plurality of interferograms within the single image. For each single raw interferogram a Fourier transform is performed to obtain a single spectral signature, and then the process is repeated. The single spectral signatures are averaged together to produce an average spectral signature of the object. It has been found that this average spectral signature derived empirically of known references correlates well with the actual spectral signature of such known references.

Figure 14:
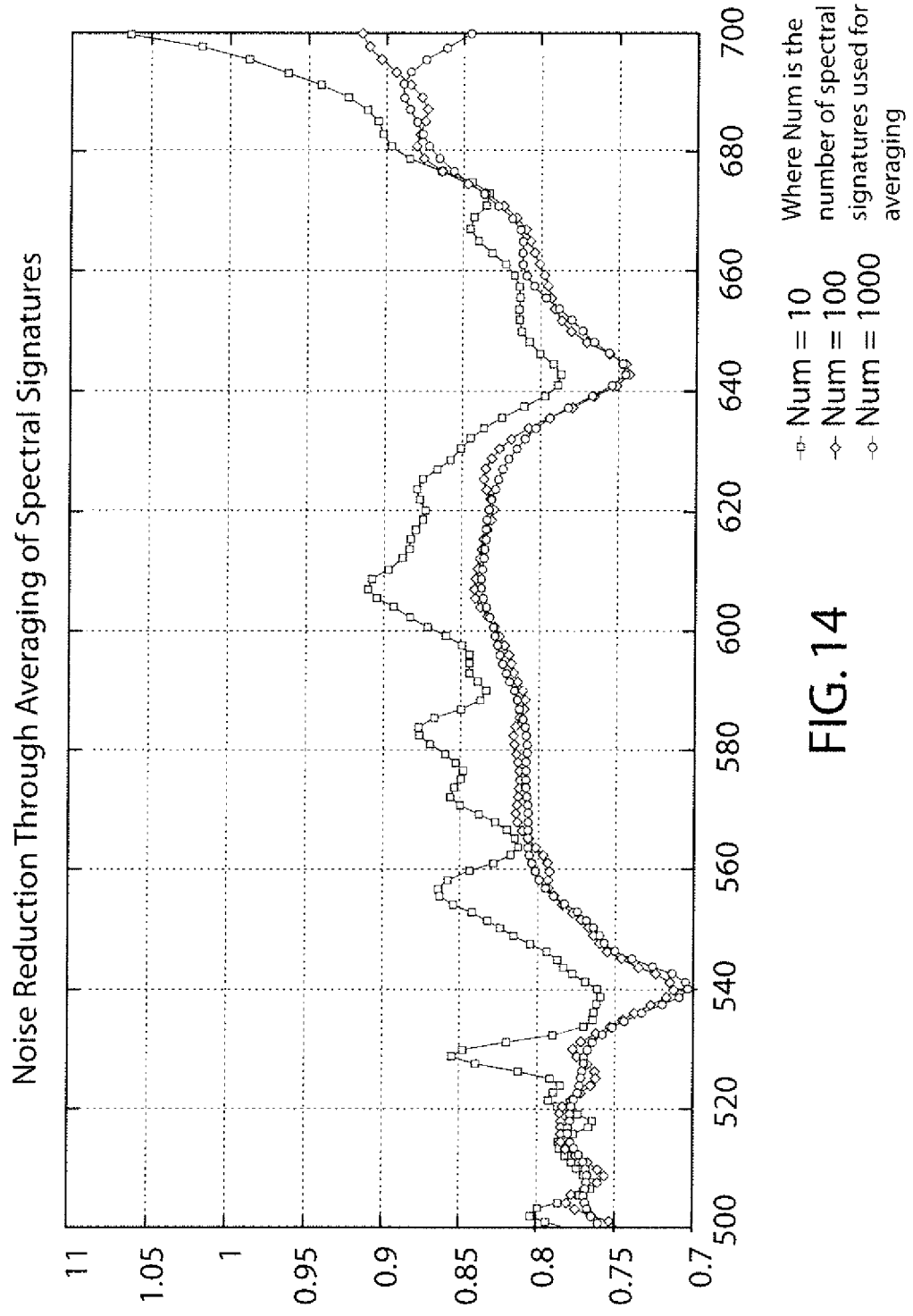
FIG. 14 shows examples of noise reduction through the averaging of a plurality of spectral signatures.

FIG. 14 demonstrates examples of this averaging technique. Three different averages are shown. Generally the more signatures are averaged, the greater the noise reduction. A first curve is an average of 10 spectral signatures, showing significant noise. However, when an average of 100 spectral signatures is made the noise is reduced, and when an average of 1000 spectral signatures is made, the noise is reduced even more. The simple Fourier transform followed by averaging can be calculated by the processor(s) of the mobile device.

A processor, typically incorporated as part of the mobile device can be used to process a signal generated by the camera corresponding to the raw image of fringes into a processed spectral signature by the use of Fourier transforms and averaging. In material analysis, the characteristic wavelengths in the processed spectral signature may be a spectral fingerprint. This spectral fingerprint can be used for matching with reference spectra stored in a mobile device database, or remotely and accessed via a network.

A useful optical parameter in material analysis is spectral reflectance (or spectral absorbance). The spectral signature of the object depends on the spectral reflectance of the object (which is an intrinsic material property) and the spectrum of light illuminating the object. As noted previously, the flash light or light source 77 is relatively consistent from phone to phone or device to device. The spectral signature of the flash light can be determined by measuring the spectral signature of a reference material with a known calibrated spectral reflectance at a fixed distance from the reference material. Once the spectral signature of the flash light is known, the spectral reflectance of the object can be determined. The spectral reflectance of an object is the division of the spectral signature of light reflected by the object with the spectral signature of the flash light.

The spectral signature of an object varies depending upon the light shone upon the object. An object will look different with indoor lighting, outdoor natural lighting, LED, fluorescent lighting, etc. The object's spectral reflectance is an intrinsic property of the object while the object's spectral signature depends upon the light falling on the object (and reflected to the spectrometer). In accordance with a highly advantageous feature, the compact spectrometer disclosed herein allows for its use for precise and tailored colour measurements, which can be useful as a sales and marketing tool by vendors to potential customers (which would be understood as including a broad range of people, including the vendor or vendor's agents and customers) who are particular about the colour of an item in different lighting conditions. For example, a vendor of an item that offers a wide range of colours, such as clothing, for example, can offer a customer the spectral reflectance of the item and the option of viewing this item under a wide range of different light sources. The steps involved are based on the relationship between spectral signature and spectral reflectance, and comprise calibrating the spectral signature of the standard light source (used as the standard, as could be found for display of the item on a website, for example) or using the calibrated spectral signature of the flash light, measuring the item's spectral reflectance, and making the item's spectral reflectance available to potential customers. Next the potential customer uses this information of the spectral reflectance of the item, and the spectral signature of a light source or a particular lighting condition of interest, to determine a simulated spectral signature of the item. In this manner the potential customer can see how the item will look in a variety of different lighting conditions.

Looking at this method of using the compact spectrometer in more detail, first, the spectral signature of the light source is calibrated. If the flash light is exactly the same from device to device, then a factory calibration is sufficient. However, the actual spectral signature of the flash light may deviate a bit and may degrade over time, so a reference material may be used to measure the actual spectral signature of the flash light. Alternatively, the vendor may use the same technique to calibrate an alternate light source/lighting condition of interest. Next, the vendor measures the item's spectral reflectance. Then the vendor (which is understood here to mean the vendor or the vendor's agent) makes the item's calibrated spectral reflectance available to potential customers. This could be done, for example, by making the item's calibrated spectral reflectance available on a website of the vendor. Such potential customers could load the item's spectral reflectance and use his own measured or archived spectral signature of a comparative light source simulating different lighting conditions (outside, inside with LED, in a disco, a pub, a bright beach, etc.) to determine a simulated spectral signature of the item and visualize how the item will look in different lighting conditions.

The method for making colour measurements of the item described above is dramatically simplified with the use of the compact spectrometers disclosed herein. The vendor uses the spectrometer during the step of measuring the spectral reflectance of the item. The vendor may also optionally use the spectrometer during the first step of obtaining a spectral signature of a standard light source. The customer or potential customer would use a spectrometer during the step of determining a simulated spectral signature of the item. The spectrometer used by the customer may be the same or different than the spectrometer used by the vendor.

From the foregoing disclosure and detailed description of certain embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for making a colour measurement of an item to be sold by a vendor, comprising, in combination, the steps of:
    obtaining a spectral signature of a standard light source;
    measuring a spectral reflectance of the item using a spectrometer;
    making the spectral reflectance of the item available to potential customers; and
    determining a simulated spectral signature of the item using the spectral reflectance of the item and a spectral signature of a lighting condition of interest.

2. The method of claim 1 wherein the step of making the spectral reflectance of the item available to potential customers is performed by the vendor, and the step of generating the simulated spectral signature is performed by the potential customer or vendor.

3. The method of claim 1 wherein both the vendor and the potential customer use a compact spectrometer which uses a camera of a mobile device.

* * * * *